US00RE36411E

United States Patent [19]

Nakamura et al.

[11] E Patent Number: Re. 36,411

[45] Reissued Date of Patent: Nov. 30, 1999

[54] WEIGHING APPARATUS WITH MEANS FOR CORRECTING EFFECTS OF VIBRATIONS

[75] Inventors: Yoshihiro Nakamura; Kazufumi Naito, both of Shiga, Japan

[73] Assignee: Ishida Co., Ltd., Kyoto, Japan

[21] Appl. No.: 08/874,826

[22] Filed: Jun. 13, 1997

Related U.S. Patent Documents

Reissue of:

[64] Patent No.: 5,117,929
Issued: Jun. 2, 1992
Appl. No.: 07/619,216
Filed: Nov. 28, 1990

[30] Foreign Application Priority Data

Dec. 1, 1989 [JP] Japan ..... 1-312391
Sep. 6, 1990 [JP] Japan ..... 2-236694

[51] Int. Cl.[6] ..... G01G 23/10; G01G 3/14

[52] U.S. Cl. ..... 177/185; 177/211

[58] Field of Search ..... 177/185, 211

[56] References Cited

U.S. PATENT DOCUMENTS

| | | | |
|---|---|---|---|
| 4,212,361 | 7/1980 | Stocker | 177/200 |
| 4,593,778 | 6/1986 | Konishi et al. | 177/185 |
| 4,624,331 | 11/1986 | Naito | 177/185 |
| 4,751,973 | 6/1988 | Freeman | 177/185 |
| 4,926,359 | 5/1990 | Konishi et al. | 177/185 |

FOREIGN PATENT DOCUMENTS

| | | |
|---|---|---|
| A103747 | 3/1984 | European Pat. Off. . |
| A122796 | 10/1984 | European Pat. Off. . |
| 0122796 | 11/1984 | European Pat. Off. . |
| A129249 | 12/1984 | European Pat. Off. . |
| A147238 | 7/1985 | European Pat. Off. . |
| 59-113724 | 1/1983 | Japan . |
| 61-040518 | 8/1984 | Japan . |
| 62-119416 | 11/1985 | Japan . |
| 62-288528 | 6/1986 | Japan . |
| 63-078023 | 9/1986 | Japan . |

*Primary Examiner*—Randy W. Gibson
*Attorney, Agent, or Firm*—Majestic, Parsons Siebert & Hsue P.C.

[57] ABSTRACT

A weighing apparatus has a scale cell and a dummy cell, both similarly structured and cantilevered. A load to be measured is applied to the free end of the scale cell and a standard weight is attached to the free end of the dummy cell. Analog electrical signals from these cells are converted to digital data. The effect of the standard weight is removed from the digital data from the dummy cell to obtain the effect of external vibrations which effect is multiplied by a suitable coefficient dependent on the applied load and subtracted from the digital data from the scale cell.

4 Claims, 2 Drawing Sheets

WEIGHING APPARATUS WITH MEANS FOR CORRECTING EFFECTS OF VIBRATIONS

Matter enclosed in heavy brackets [ ] appears in the original patent but forms no part of this reissue specification; matter printed in italics indicates the additions made by reissue.

BACKGROUND OF THE INVENTION

This invention relates to a weighing apparatus using a load cell as its weight sensor and, more particularly, to the technology of correcting the effects of vibrations, for example, from the floor on which such an apparatus is set.

In a weighing apparatus using a load cell as its weight sensor, the load cell has one of its edges fastened to a base and the other end to support the weight of an object to be weighted such that the strain generated therein according to the applied load is converted into an electrical signal by means of gauges. Since the load cell is thus cantilevered, it is easily affected by the vibrations, for example, from the floor on which the apparatus is set. This naturally gives rise to the problem of yielding erroneous results in measurements.

In order to solve this problem, Japanese Patent Publication Tokkai 60-142216 disclosed a technology of providing a weighing apparatus equipped with a second load cell, referred to as the dummy cell, which is structured and cantilevered just like the one for measuring the load and to cancel the vibratory component contained in the weight signal by inputting both the weight signal and the signal from this dummy cell to an operational amplifier. In general, however, a signal outputted from a load cell contains noise components having higher frequencies than mechanical vibrations. Thus, although a low pass filter composed of an analog circuit is frequently used to extract only the low-frequency components in such a situation, the drift of the DC amplifier itself in the low-pass filter and phase shifts due to errors in the circuit constants of capacitors, etc. tend to cause level shifts and phase differences in the signals from the load cells. As a result, the vibrations from the floor cannot be eliminated satisfactorily, causing errors in the measurement.

SUMMARY OF THE INVENTION

It is therefore an object of the present invention to provide an improved weighing apparatus capable of reliably eliminating the effects of external vibrations.

A weight sensor embodying the present invention is characterized as having not only a load cell for weighing an object (referred to as a scale cell) having one end secured to a base and the other attached to an object-carrying table for placing thereon the object to be weighed but also another load cell (referred to as a dummy cell) having one end secured to the base and the other end attached to a standard weight of a known weight. The weight sensor is further provided with a first analog-to-digital converter means for converting the analog electrical signals from the scale cell into digital data, a first filter means for filtering the digital data from the first analog-to-digital converter means, a second analog-to-digital converter means for converting the analog electrical signals from the dummy cell into digital data, a second filter means for filtering the data from the second analog-to-digital converter means, a multiplier means for multiplying the output data from the second filter means by a coefficient which is proportional to the weight of the object to be weighed and a subtractor means for outputting the difference between the data from the first filter means and the output from this multiplier means. With the weight sensor thus structured, the analog electrical signals from the scale cell being subjected to external vibrations and from the dummy cell which is affected only by the external vibrations are separately, converted into digital data by means of the analog-to-digital converter means. After these data are filtered digitally, the desired components can be extracted from the signals from the scale and dummy cells. Thereafter, the vibratory component data from the dummy cell is multiplied by a coefficient proportional to the weight of the object to be weighed and the difference is digitally calculated between this data and the digital data from the scale cell. In this manner, the signal components caused by external vibrations can be dependably canceled regardless of the effects of drift and phase delays which are common with analog filter circuits.

BRIEF DESCRIPTION OF THE DRAWINGS

In the drawings.

In these drawings, components which are substantially identical or at least equivalent to each other are indicated by the same numerals.

DETAILED DESCRIPTION OF PREFERRED EMBODIMENTS

Figure 1:
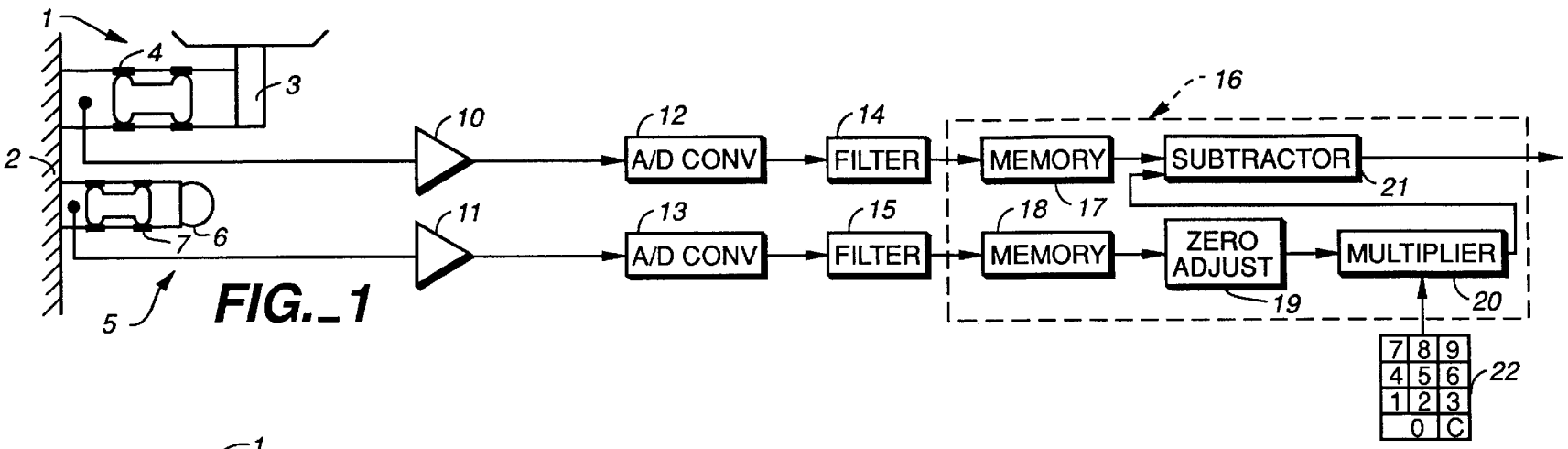
FIG. 1 is a block diagram of a weighing apparatus embodying the present invention.

As shown in FIG. 1, a weighing apparatus according to one embodiment of the present invention includes a scale cell 1 and a dummy cell 5. The scale cell 1 is a load cell serving as load-detecting means, having one end secured to a housing frame 2 and the other end attached to a load-carrying table 3. Strain gauges 4 are attached to surfaces of the scale cell 1 such that an electrical signal indicative of (or proportional to) the weight of an object placed on the load-carrying table 3 is outputted. The dummy cell 5, on the other hand, serves as vibration-detecting means and is another load cell with one end attached to the same housing frame 2 so as to be subjected to the same external vibrations as are experienced by the scale cell 1. The other end of the dummy cell 5 is not attached to the load-carrying table 3 but is essentially a free end except a standard weight 6 (of a known weight) is attached thereto. Strain gauges 7 are attached to surfaces of the dummy cell 5 such that the strain caused by external vibrations is converted into an electrical signal.

These electrical signals from the load cells (the scale cell 1 and the dummy cell 5) are respectively amplified by preamplifiers 10 and 11, thereafter converted into digital data by analog-to-digital converters (A/D CONV) 12 and 13, and still thereafter inputted into a correcting circuit 16 (or a digital signal processing unit) through digital filters 14 and 15 which serve to arithmetically process these digital data so as to filter out relatively high-frequency noise, that is, such low-frequency components caused by the vibrations of the load cells 1 and 5 and the load-carrying table 3.

As schematically illustrated, the correcting circuit 16 includes memory devices 17 and 18 for sequentially storing the data outputted from the digital filters 14 and 15, respectively, a zero-point adjusting circuit (ZERO ADJUST) 19, a multiplier 20 and a subtractor 21. The zero-point adjusting circuit 19 is for adjusting to zero the digital data outputted from the analog-to-digital converter 13 as the initial load corresponding to the standard weight. The multiplier 20 is for multiplying a coefficient K to be explained below to the data received from the zero-point adjusting circuit 19 and outputting a signal indicative of the product thus calculated. The subtractor 21 is for digitally calculating the difference between the data received from the scale cell 1 and the data received from the multiplier 20. The ratio $K_1$ between the sensitivity of the scale cell 1 and that of the dummy cell 5 (defined as the ratio of their outputs $E_1$ and $E_2$ when they are subjected to a unit weight, or $K_1=E_1/E_2$) is presumed set preliminarily. After an object to be weighed is placed on the load-carrying table 3, the ratio $K_2$ between the total weight $W_1$ on the scale cell 1 (that is, the sum of the weights of the load-carrying table 3, the scale cell 1 itself and the object to be weighed) and the total weight $W_2$ on the dummy cell 5 (that is, the sum of the weights of the dummy cell 5 itself and the standard weight 6), or $K_2=W_1/W_2$, and the product $K=K_1K_2$ are calculated by the multiplier 20 which then multiplies K to the output data received from the zero-point adjusting circuit 19, outputting the result of this multiplication to the subtractor 21.

Next, the operation of the weight sensor thus structured will be described more in detail when, for example, it is used as a so-called weight checker, that is, a device for checking whether a given object to be weighed is indeed of a predetermined standard weight.

To start, necessary parameters such as the weight of the load-carrying table and the sensitivity coefficient $K_1$ are inputted through a keyboard 22 such that the multiplier 20 will be ready to calculate the product K defined above. When the object to be weighed is thereafter after placed on the load-carrying table 3, a strain proportional to the weight defined above as $W_1$ is generated in the scale cell 1 and an analog electrical signal indicative of this value is outputted therefrom. This analog electrical signal is amplified by the preamplifier 10 and is thereafter outputted as a digital signal with (relatively) high-frequency noise removed therefrom by the analog-to-digital converter 12 and the digital filter 14.

In the meantime, the dummy cell 5 is subjected to a strain corresponding to the weight defined above as $W_2$ and outputs an analog electrical signal indicative of this weight value $W_2$. This analog electrical signal is amplified by the preamplifier 11 and is thereafter outputted as another digital signal with (relatively) high-frequency noise removed therefrom by the analog-to-digital converter 13 and the digital filter 15. From this outputted digital signal, the portion representative of the standard weight 6 is cancelled by the digital processing of the zero-point adjusting circuit 19.

If there are no external vibrations such as those propagated from the floor to the weighing apparatus being used, the aforementioned analog electrical signals become DC signals because the strains in the scale and dummy cells 1 and 5 are of constant values. As a result, the zero-point adjusting circuit 19 outputs a zero signal and the substractor 21 directly outputs the signal from the digital filter 14 as weight data.

If the weighing apparatus is subjected to external vibrations, on the other hand, the scale cell 1 outputs a signal containing AC components of frequencies matching those of the external vibrations and of the level width proportional to the sum of the weights of the load-carrying table 3, the scale cell 1 and the object being weighed. Similarly, the dummy cell 5 outputs an analog electrical signal containing AC components of frequencies matching those of the same external vibrations and of the level width proportional to the sum of the weights of the standard weight 6 and the dummy load cell 5 itself. After this analog electrical signal is converted into digital data by the analog-to-digital converter 13, high-frequency noise components are removed by the digital filter 14 and only the vibratory components are extracted therefrom to be converted into vibratory component data by means of the zero-point adjusting circuit 19.

The multiplier 20 then multiplies the data from the zero-point adjusting circuit 19 by the coefficient K which is proportional to the weight $W_1$ and outputs the product for correcting the amplitude of the aforementioned vibratory component from the dummy cell 5 caused by the difference between $W_1$ (the total weight on the scale cell 1) and $W_2$ (the total weight on the dummy cell 5). The subtractor 20 receives from the digital filter 14 the data containing vibration data and from the multiplier 20 the vibration data, and digitally subtracts the latter from the former to output the difference therebetween. Thus, the vibration data contained in the weight data from the scale cell 1 is cancelled by the data from the multiplier 20, the remainder representing the weight of the object to be weighed. Since this cancellation calculation, is carried out digitally, there arises no problem of time shifts or drifts between the weight data and the vibration data. Moreover, since data from the two load cells 1 and 5 corresponding to the same point in time can be stored, the analog electrical signal caused by external vibrations can be reliably removed from the analog electrical signal from the scale cell 1.

Figure 2:
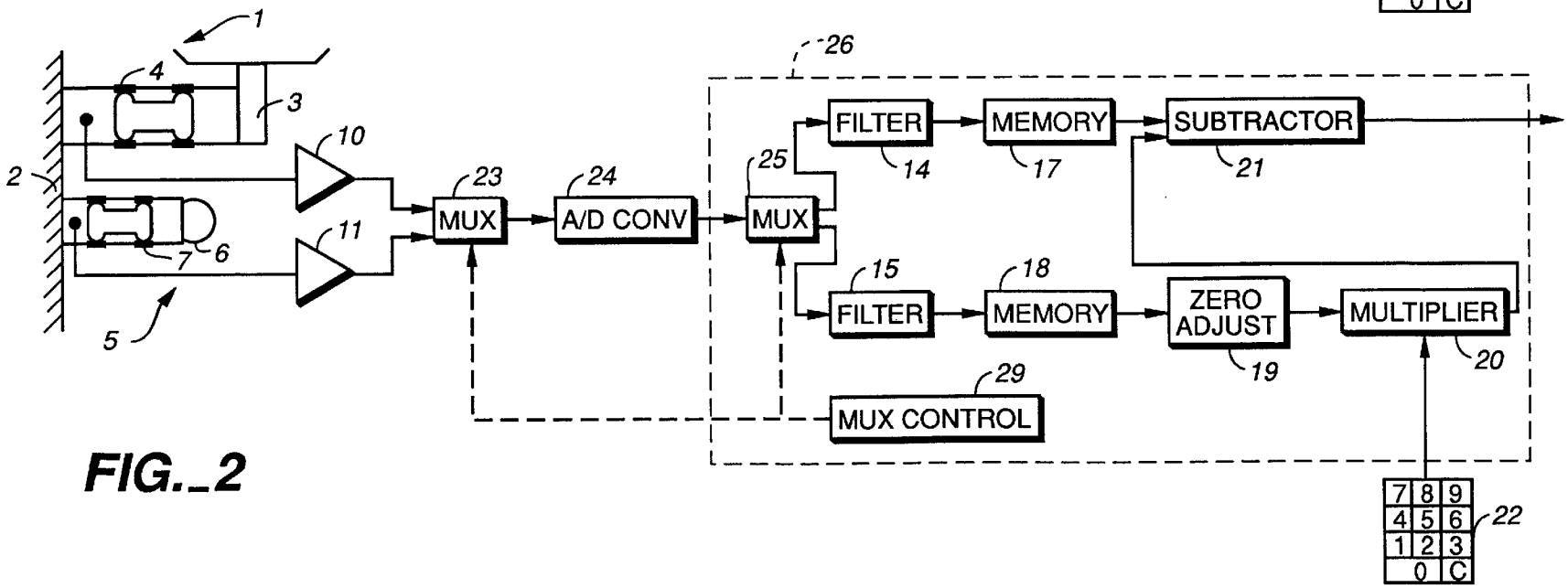
FIG. 2 is a block diagram of another weighing apparatus embodying the present invention.

In FIG. 2 which shows a weighing apparatus according to a second embodiment of the present invention, numeral 23 indicates a first-stage multiplexer for alternately outputting the analog electrical signals from the scale and dummy cells 1 and 5 respectively through the preamplifiers 10 and 11 to a single common analog-to-digital converter 24 at a [frequency] *period* significantly shorter than (for example, about 1/100 of) those of external vibrations. Numeral 26 indicates a correction circuit (or a digital signal processing unit) serving a similar purpose as the correction circuit 16 described above in connection with FIG. 1. This correction circuit 26 includes not only a zero-point adjusting circuit 19, a multiplier 20 and a subtractor 21 as explained above, but also a second-stage multiplexer 25, digital filters 14 and 15 and memory devices 17 and 18. The second-stage multiplexer 25 serves to operate in synchronism with the first-stage multiplexer 23 to thereby output the digital data from the analog-to-digital converter 24 to the digital filters 14 and 15 which are similar to each other, the digital filter 14 serving to remove the low-frequency components caused by the vibrations of the scale cell 1 and the load-carrying table 3 from the digital data obtained from the load-detecting system and the digital filter 15 serving to remove components with frequencies higher than the characteristic frequency of the dummy cell 5 from the digital data obtained from the vibration-detecting system. The memory devices 14 and 15, as explained above, serve to sequentially store the output data from the digital filters 14 and 15, respectively.

After the zero-point adjusting circuit 19 cancels the weight of the standard weight 6 from these signals stored in the memory device 18, the multiplier 20 multiplies the coefficient K thereto and outputs the results thus obtained to the subtractor 21. The subtractor 21 serves to calculate the difference between the digital data from the filter 14 stored in the memory device 17 and the digital data from the multiplier 20 to thereby output data from which vibratory component has been removed. In FIG. 2, numeral 29 indicates a multiplexer controlling device for operating the two multiplexers 23 and 25 in mutual synchronism with respect to each other.

This embodiment of the invention is characterized wherein the analog electrical signals from the individual load cells 1 and 5 are amplified by their respective preamplifiers 10 and 11 to predetermined levels and are thereafter inputted alternately to the same analog-to-digital converter 24 by means of the first-stage multiplexer 23, becoming thereby converted into digital data. These digital data are subsequently distributed by means of the second multiplexer 25 operating in synchronism with the first-stage multiplexer 23 between the digital filters 14 and 15 respectively associated with the scale and dummy cells 1 and 5. Since these two multiplexer 23 and 25 operate at an extremely high frequency compared to the vibratory component, the memory devices 17 and 18 store only data from which vibrating components have been carefully removed. The zero-point adjusting circuit 19, the multiplier 20 and the subtractor 21 operate as explained above by way of FIG. 1.

This embodiment explained above by way of FIG. 2 is advantageous in that a single analog-to-digital converter is shared. Since analog-to-digital converters are relatively expensive, apparatus according to this embodiment of the invention can be both simpler in structure and less expensive.

Figure 3:
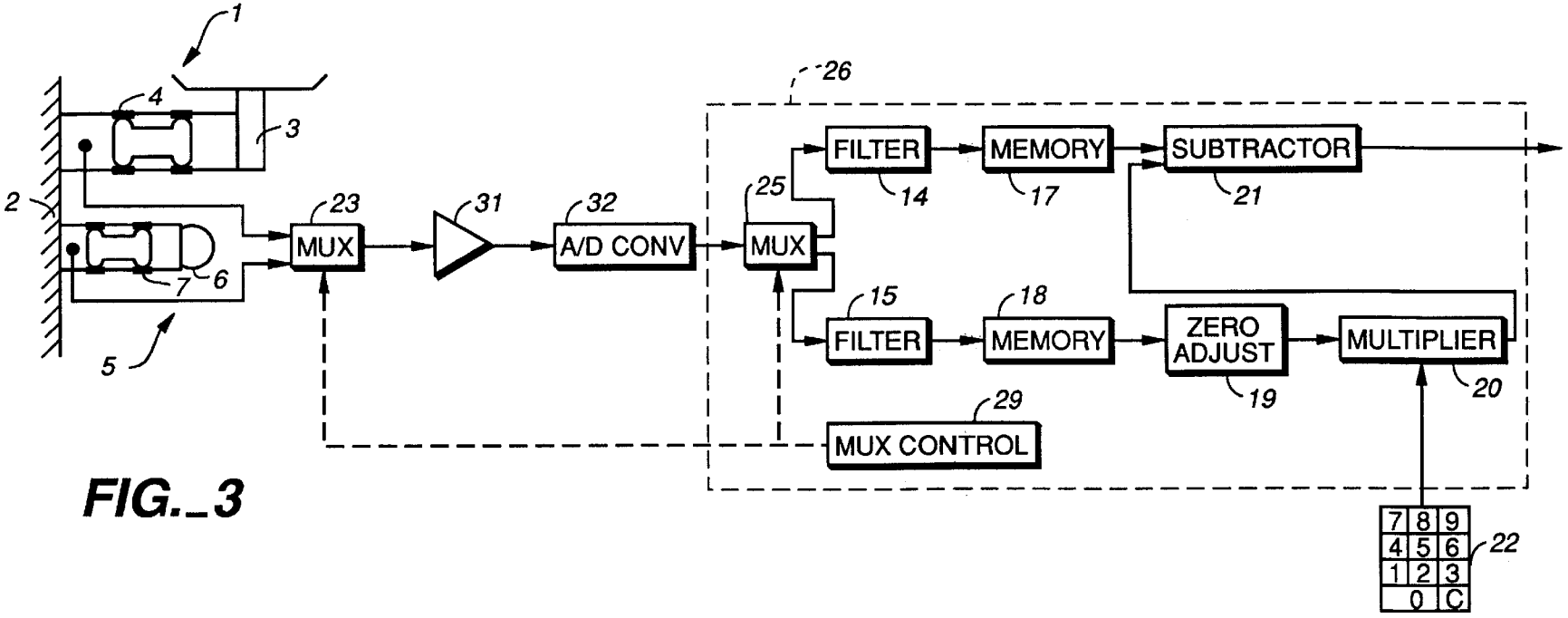
FIG. 3 is a block diagram of still another weighing apparatus embodying the present invention.

In FIG. 3 which shows a weighing apparatus according to a third embodiment of the invention, numeral 23 again indicates a first-stage multiplexer which, operating at an extremely short [frequency] *period* (say, about 1/100 of the [frequencies] *periods* of external vibrations) in synchronism with the operating frequency of the correcting unit 26, alternately sends the analog electrical signals from the scale and dummy cells 1 and 5 to a same (common) preamplifier 31. On its output side, this common preamplifier 31 is connected to a single (common) analog-to-digital converter 24 serving to convert signals both from the scale cell 1 and the dummy cell 5 to digital signals and to output them to the correcting circuit 26. As explained above by way of FIG. 2 in connection with the second embodiment of the present invention, the correcting circuit 26 serving as a digital signal processing unit includes the digital filter 14 serving to remove the low-frequency components caused by the vibrations of the scale cell 1 (that is, the components with frequencies higher than the characteristic frequency of the scale cell 1) from the digital data obtained from the load-detecting system, the digital filter 15 serving to remove components with frequencies higher than the characteristic frequency of the dummy cell 5 from the digital data obtained from the vibration-detecting system, and the second-stage multiplexer 25 which operates in synchronism with the first-stage multiplexer 23 to send output signals to these digital filters 14 and 15. In addition, the correcting circuit 26 includes memory devices 17 and 18, a zero-point adjusting circuit 19, a multiplier 20, a subtractor 21, and a multiplexer controlling device 29 which function as explained above in connection with the second embodiment of the present invention.

When an object to be weighed is placed on the load-carrying table 3 after necessary parameters such as the weight of the load-carrying table 3 and the sensitivity coefficient $K_1$ are inputted through a keyboard 22 as explained above in connection with the first embodiment of the present invention, a strain proportional to the weight defined above as $W_1$ is generated in the scale cell 1 and an analog electrical signal indicative of this value is outputted therefrom. The analog electrical signals outputted from the scale and dummy cells 1 and 5 are alternately received and amplified to specified levels by the preamplifier 31 and then converted to digital signals by the analog-to-digital converter 24. Since the second-stage multiplexer 25 operates in synchronism with the first-stage multiplexer 23, the weight signals from the scale cell 1 are outputted to the digital filter 14 and the vibratory signals from the dummy cell 5 are outputted to the other digital filter 15. Thus, it is digital signals (or data) from which (relatively) high-frequency noise has been removed that come to be stored in the memory devices 17 and 18 and the portion corresponding to the standard weight 6 is canceled by the zero-point adjusting circuit 19 from the digital data stored in the memory device 18. The functions of the zero-point adjusting circuit 19, the multiplier 20, and the subtractor 21 are the same as described above.

This embodiment of the invention explained above by way of FIG. 3 is advantageous in that a single preamplifier serves to amplify signals from both the scale cell 1 and the dummy cell 5 such that the number of components is reduced and in that errors due to drifts generated in preamplifiers can be prevented and hence that the vibratory components can be removed with improved accuracy.

The present invention has been described by way of only a limited number of embodiments but these embodiments are intended to be merely illustrative and not as limitative of the scope of the invention. Many variations are conceivable within the scope of the invention. For example, although digital filters and analog-to-digital converters were described as independent elements in the embodiments presented above, use may be made equally well of analog-to-digital converters having a digitally filtering function. Although the effect of the standard weight 6 of the dummy cell 5 was shown to be cancelled by means of the zero-point adjusting circuit 19, a similar effect can be obtained by balancing a bridge circuit formed by the strain gauges 7 when there are no external vibrations such that only the vibratory component can be outputted. In summary, the present invention teaches weighing apparatus capable of removing effects of noise caused by external vibrations from weight signals outputted from the scale cell without adverse effects of drifts in amplifiers or phase delays due to circuit elements such as capacitors and resistors. As a result, accuracy of measurement as well as sensitivity can be improved according to the present invention.

What is claimed is:

[1. A weighing apparatus comprising a base, a weight-measuring load cell having one end thereof secured to said base and the other end thereof supporting a load-carrying table, a dummy load cell having one end thereof secured to said base, a standard weight being attached to the other end of said dummy cell, first analog-to-digital converter means for converting analog electrical signals from said weight-measuring load cell to digital data, first filter means for filtering digital data from said first analog-to-digital converter means, second analog-to-digital converter means for converting analog electrical signals from said dummy load cell to digital data, second filter means for filtering digital data from said second analog-to-digital converter means, multiplier means for multiplying a coefficient to output data from said second filter means, said coefficient being dependent on the weight of an object being weighed by said weighing apparatus, and subtractor means for outputting the difference between data outputted from said first filter means and an output from said multiplier means.]

[2. The weighing apparatus of claim 1 wherein said coefficient is proportional to said weight.]

3. A weighing apparatus comprising a base, a weight-measuring load cell having one end thereof secured to said base and the other end thereof supporting a load-carrying table, a dummy load cell having one end thereof secured to said base, a standard weight being attached to the other end of said dummy cell, signal multiplexing means for alternately outputting signals from said weight-measuring load cell and said dummy load cell at a multiplexing [frequency] *period* which is shorter than *periods of* external [vibration frequencies]*vibrations*, analog-to-digital converter means for converting signals outputted from said signal multiplexing means to digital data, filtering means for filtering digital data from said analog-to-digital converter means at said multiplexing frequency, multiplier means for multiplying a coefficient to data outputted from said filter means when said signal multiplexing means is outputting a signal from said dummy load cell, said coefficient being dependent on the weight of an object being weighed by said weighing apparatus, and subtractor means for outputting the difference between data outputted from said filter means when said signal multiplexing means is outputting a signal from said weight-measuring load cell and data from said multiplier means.

4. The weighing apparatus of claim 3 wherein said coefficient is proportional to said weight.

5. A weighing apparatus comprising a base, a weight-measuring load cell having one end thereof secured to said base and the other end thereof supporting a load-carrying table, a dummy load cell having one end thereof secured to said base, a standard weight being attached to the other end of said dummy cell, signal multiplexing means for alternately outputting signals from said weight-measuring load cell and said dummy load cell at a multiplexing [frequency] *period* which is shorter than *periods of* external [vibration frequencies] *vibrations*, a common preamplifier means for receiving outputs from said signal multiplexing means, analog-to-digital converter means for converting outputs from said preamplifier means to digital data, filter means for filtering digital signals from said analog-to-digital converter means at said multiplexing frequency, multiplier means for multiplying a coefficient to data outputted from said filter means when said signal multiplexing means is outputting a signal from said dummy load cell, said coefficient being dependent on the weight of an object being weighed by said weighing apparatus, and subtractor means for outputting the difference between data outputted from said filter means when said signal multiplexing means is outputting a signal from said weight-measuring load cell and data from said multiplier means.

6. The weighing apparatus of claim 5 wherein said coefficient is proportional to said weight.

* * * * *